United States Patent [19]

Margerum

[11] 4,034,372
[45] July 5, 1977

[54] VELOCITY GATE HAND-OFF SYSTEM

[75] Inventor: Donald Lee Margerum, Woodland Hills, Calif.

[73] Assignee: Northrop Corporation, Los Angeles, Calif.

[22] Filed: July 12, 1976

[21] Appl. No.: 704,645

[52] U.S. Cl. .......................... 343/6.8 R; 244/3.14; 343/18 E
[51] Int. Cl.[2] ...................... G01S 9/56; G01S 7/36
[58] Field of Search ......... 343/6.8 R, 6.8 LC, 18 E; 244/3.14

[56] References Cited

UNITED STATES PATENTS

| | | | |
|---|---|---|---|
| 3,044,061 | 7/1962 | Richmond et al. | 343/6.8 R |
| 3,113,268 | 12/1963 | Horak | 343/18 E |
| 3,384,893 | 5/1968 | Prestwood | 343/6.8 R |
| 3,921,121 | 11/1975 | Huisveld, Jr. et al. | 343/18 E |
| 3,950,751 | 4/1976 | Orr et al. | 343/18 E |

Primary Examiner—S.C. Buczinski
Attorney, Agent, or Firm—William W. Rundle; Willard M. Graham

[57] ABSTRACT

A system for programming the radar return signal from an airborne target carrier to gradually increase its frequency and attenuate its amplitude timed with respect to the launching of a target from the carrier, the target having its own fixed radar return, so that the velocity gate of the doppler tracking radar of a missle fired at the carrier will be smoothly handed off from the carrier to the target when the target is launched from the carrier. The programming equipment comprises timed serrodyne modulation of a traveling wave tube phase shifter to control the frequency change, and a controlled attenuator to reduce the amplitude of the returned "reflected" signal, together with necessary timing controls, the operation of the system being initiated by a command signal to launch the target.

10 Claims, 8 Drawing Figures

VELOCITY GATE HAND-OFF SYSTEM

BACKGROUND OF THE INVENTION

The present invention relates to radar electronics, and more particularly, to a method and means for transferring or shifting the radar return signal of a doppler radar from one target being tracked to another. It applies especially to the field of testing or training, where practice firings of a radar-guided missile are directed toward a purposely supplied incoming target or targets.

At the present time, remotely controlled drone aircraft carry one or more airborne targets which are launched from the drone and have a short self-propelled flight period and then a free-flight period during which they are used as practice targets for missiles using doppler radar to home in on the target. As the carrier drone approaches the firing range, the radar of a ground-to-air missile, for example, picks up and tracks the carrier drone with its attached target. The target is launched from the carrier as the missile approaches, soon enough for safe separation at missile impact, but not so soon that the target glide time expires before intercept. After launch of the target, then, the missile is to track and aim at the target alone, while the carrier drone can turn and cruise until another approach and target launch or else return to its base and land for installation of more of the expendable targets.

The missile guidance doppler radar uses a velocity gate to distinguish the intended target from objects at other speeds, but sometimes the velocity gate is not pulled off from the carrier drone to the target when the latter rapidly accelerates away from the drone during target launch. As a result, the fired missile continues training on the drone and can hit it instead of the intended target.

The use of velocity-gate pull-off (VGPO) for deceptive countermeasures against doppler radars has been widespread, but such conventional systems would not solve the problem identified above. In such systems the VGPO is followed by an abrupt stop in radar return signal or an abrupt shift in doppler for the purpose of causing the radar to revert to an acquisition or hunting mode. In this mode the radar is likely to re-acquire the drone rather than the target, and in addition would subject the missile system which is being evaluated to unacceptable transients.

The present invention may be called a velocity-gate hand-off (VGHO) system. It is the purpose of the present VGHO invention not to simply pull off the velocity gate from one object, but to hand it off or transfer it smoothly to another object (target).

A further object of this invention is to hand off the velocity gate of a tracking doppler radar from a target carrier vehicle to the target when the target is launched from its carrier, so that a missile guided by the radar will then aim at the target alone and not at the carrier vehicle.

It is another object in such a VGHO device to hand off the velocity gate of a doppler radar guided missile without introducing significant transients in the radar system.

BRIEF SUMMARY OF THE INVENTION

Briefly, my invention comprises a means and method of modifying the radar return signal from a vehicle carrying a target to be launched or released therefrom, the modifying means operating to smoothly change the doppler frequency and amplitude of the return signal so that its appearance to the velocity gate of a doppler radar will approach and become equivalent to that of the target alone shortly after the target launching instant, and then disappear from the radar tracking gate which will continue to track the stronger target signal. A receiving antenna in the vehicle nose, for example, feeds the received radar signal to an amplifier in turn feeding a variable attenuator whose output is fed to a transmitting antenna from which the radar return signal is radiated. A timing control operates in response to a command signal to launch the target, to phase-shift the amplifier to increase the return doppler frequency at a desired rate and to concurrently increase the attenuation of the return signal. The target has its own built-in radar reflective means and when the increasing doppler return frequency of the present system reaches that of the return from the accelerated target, the diminished amplitude of the return signal from the present system is below that of the target return signal, causing and allowing the velocity gate of the doppler radar to lock on the target and stop tracking the target-carrying vehicle.

This invention will be more fully understood by reference to the following detailed description of a preferred mode and apparatus for putting it into effect, and to the accompanying drawings of a specific embodiment.

DETAILED DESCRIPTION

Figure 1:
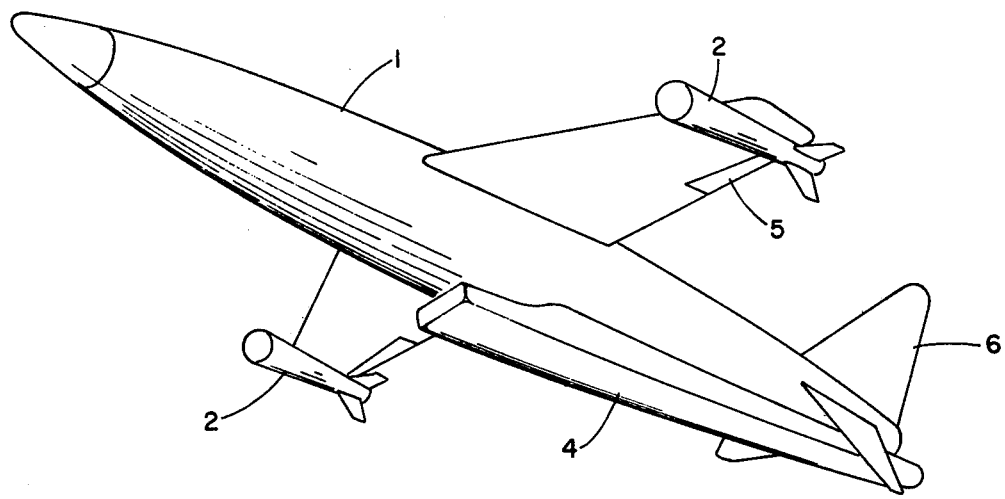
FIG. 1 is a perspective view of a drone aircraft carrying a launchable self-powered target at each wing tip.
Figure 2:
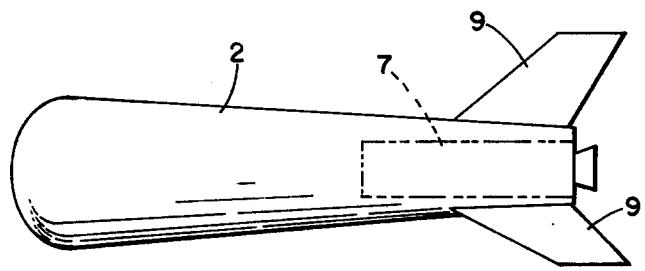
FIG. 2 is a left side elevation view of one target alone.

Referring first to FIGS. 1 and 2 for a detailed description of an example of my invention, a target carrier aircraft 1 is a remote radio controlled drone carrying one releasable flying target 2 at each wing tip. The target carrier aircraft 1 illustrated herein has a low mounted jet engine enclosed in an engine nacelle 4, conventional ailerons 5 and tail surfaces 6.

The target 2, as further shown in FIG. 2, is a small, expendable structure acting as a radar augmenter, has a rocket motor 7 and three fixed tail fins 9 at the rear. The outer surface of the target may be radar reflective, or it may contain internal radar reflector means, such as a Luneberg lens, for example, in the nose. The target 2 also has conventional launching means (not shown)

for releasing it from hangers or a launching rail on the carrier 1 when the target motor 7 is ignited. It is intended to accelerate away from the carrier 1 for a short time (1.5 to 2 seconds, for example) and then (if not hit the missile fired at it) follow a free-flight projectile trajectory to the ground after the rocket motor 7 burns out. The target 2 may or may not have a wing, and may be spin-stabilized if no wing is provided.

Figure 3:
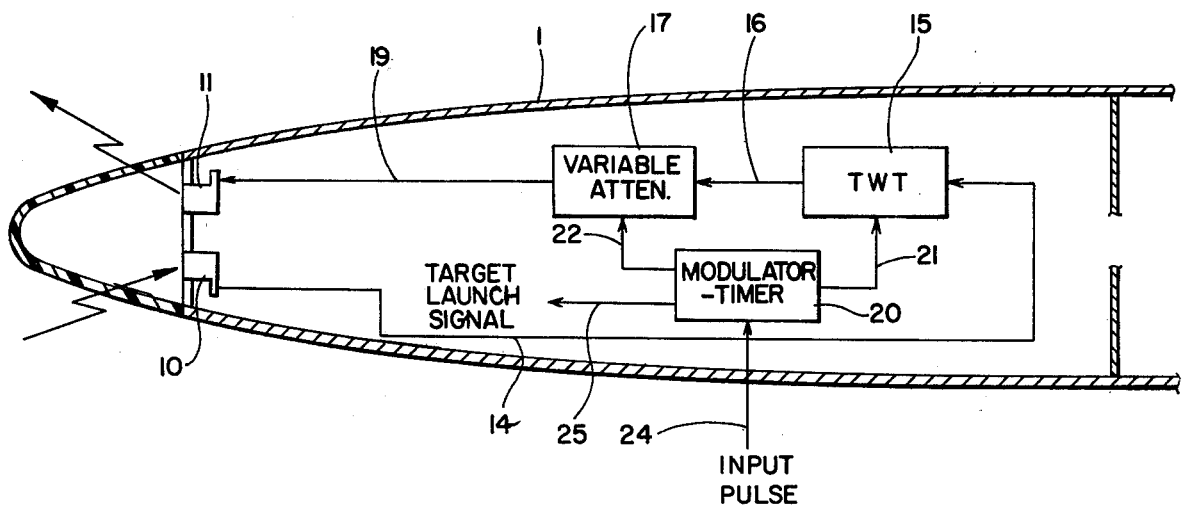
FIG. 3 is a diagrammatic side view of the front portion of the drone carrier in FIG. 1, showing the broad essentials of the present VGHO system therein.

Referring now to FIG. 3, the present invention is provided in the target carrier aircraft 1, a portion of which is shown in FIG. 3. Inside a radio-transparent nose, a suitable receiving antenna 10 and a transmitting antenna 11 are separately mounted. The receiving antenna 10 receives radar signals from a missile guidance doppler radar system which will normally be located on the ground for a ground fired missile, or in another vehicle for a ship or air launched missile. Receiving antenna 10 should be connected to an amplifier; in this case a coaxial lead-in line 14 leads from receiving antenna 10 to a traveling wave tube (TWT) amplifier 15, for example.

The output of the TWT 15 is connected by a conductor 16 to a variable attenuator 17, whose output is in turn connected by a coaxial lead-out line 19 to the transmitting antenna 11. The latter antenna 11 radiates signals which are picked up by the missile guidance radar system. Both the launching site and the missile to be fired from it (not shown) have components of the missile guidance radar therein.

The heart of this invention is a modulator-timer 20 having outputs on a first control lead 21 to the TWT 15 and on a second control lead 22 to attenuator 17. The input to modulator-timer 20 is on an input signal line 24 to which a remotely generated signal is applied at the desired moment when the missile is approaching the carrier drone 1. This signal may be manually initiated by ground personnel via a conventional radio link. These ground personnel have been tracking the carrier 1 and controlling its flight, and are assumed to be in communication with the missile firing crew. In the present invention, the signal received on input signal line 24 is preferably a pulse, which starts the operating cycle of the VGHO system. The modulator-timer 20 also has an output lead 25 which applies a target motor starting and launching signal at the proper time. Reference is here made to U.S. Pat. No. 3,866,226 to Benneche et al. for further information on target launching signal apparatus.

Figure 4:
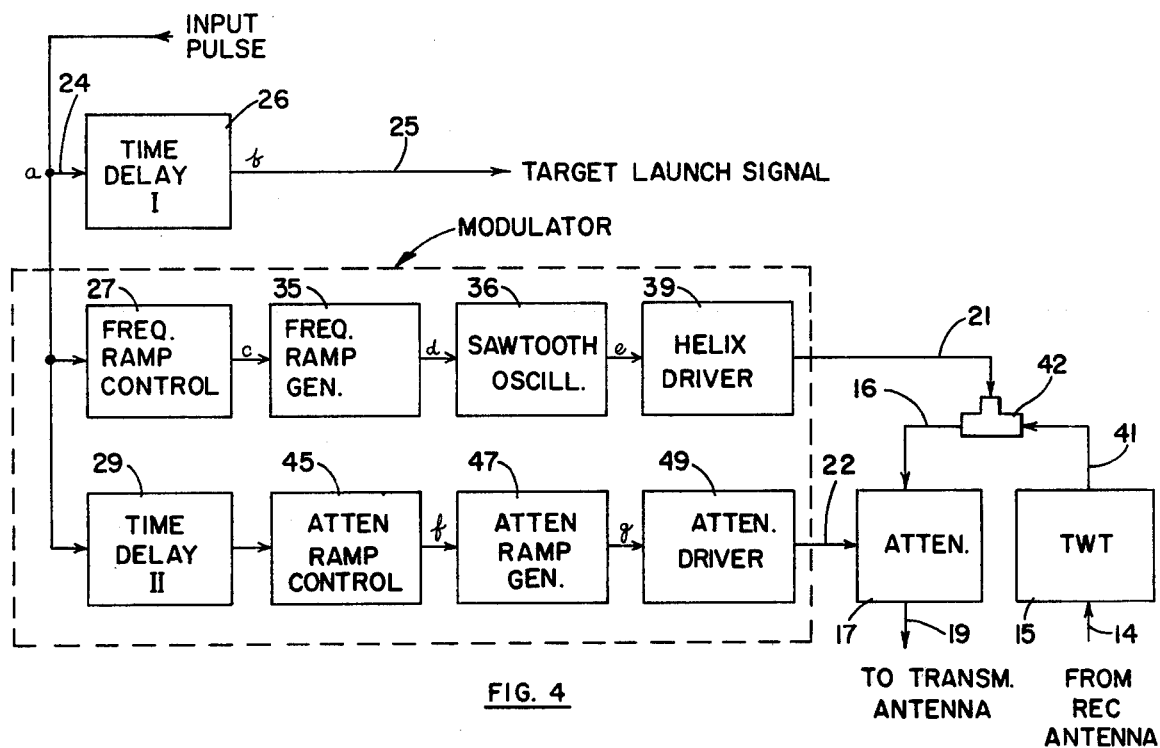
FIG. 4 is a block diagram of a complete VGHO system invention.

FIG. 4 shows the modulator-timer 20 in more detail. The input signal line 24 is directly connected to a first time delay 26, a frequency ramp control 27 and a second time delay 29. Waveforms at the various points $a$, $b$, $c$, etc. in FIG. 4 are shown on corresponding lines $a$, $b$, $c$, etc. of FIG. 6 in relation to time. The waveforms are illustrative only, and the invention is not restricted to the exact shape, length, polarity or relative amplitude of these individual waveforms as shown. An input command pulse 30 (FIG. 6) as referred to before on input signal line 24 is delayed for approximately one-half second in this example by first time delay 26, which produces a target launch pulse 31 on output lead 25 (FIG. 3). The leading edge of this launch pulse 31 ignites rocket motor 7 and launches target 2 from the carrier 1.

The command pulse 30 leading edge also triggers the frequency ramp control 27 which is a suitable conventional timer circuit having an output at point comprising the desired length of a frequency control signal 34.

The leading edge of this signal 34 starts operation at frequency ramp generator 35 to produce at its output a ramp voltage as shown at point d. This output from frequency ramp generator 35 is applied to a sawtooth oscillator 36 to produce an increasing frequency waveform at point e. After passing through a helix driver 39, this waveform output from oscillator 36 is ready to be applied to the helix of TWT 15, along the first control lead 21. This will be recognized as the conventional serrodyne modulation of a signal being amplified through the TWT 15. A different type amplifier may be phase-shifted by different apparatus if desired. Alternatively, the phase shift could be produced by other means not including an amplifier.

Figure 5:
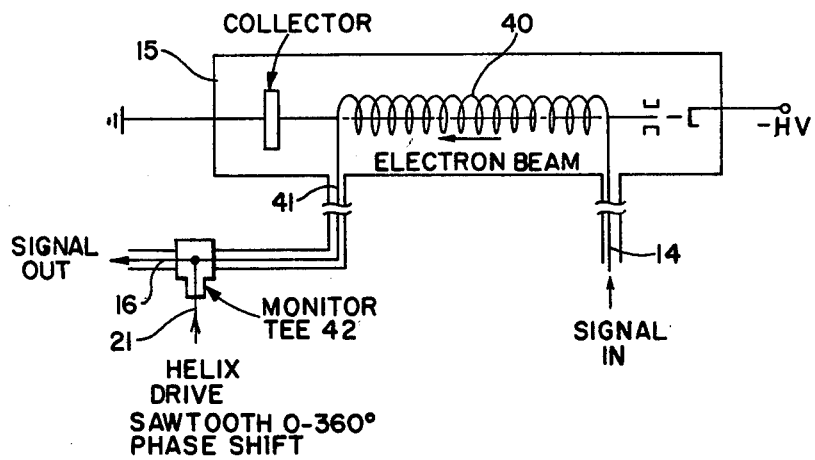
FIG. 5 is a simplified drawing showing how the output frequency of the traveling wave tube of FIG. 4 is connected to be altered by the present VGHO system.

FIG. 5 shows further details of one example of connecting the modulating (frequency increasing) signal from the helix driver 39 to the TWT 15. The received input signal on coaxial lead-in line 14 is connected to the helix 40 of the TWT 15 near the electron gun end thereof, and at or near the opposite end of helix 40 an output wire 41 connects to one end of a monitor tee 42 common in the art and preferably mounted on or adjacent the TWT 15. The first control lead 21, output wire 41 and conductor 16 are connected together internally of the monitor tee 42, and it is thus seen how the modulating signal from helix driver 39 causes the TWT output frequency to be increased.

It will be noted that in this case, the frequency ramp generator 35 is designed to saturate before the end of the frequency control signal 34. It is preferred to generate an increasing frequency up to a desired maximum amount only, hold it constant until the end of the frequency control signal 34, and then return it abruptly to the original. The increased frequency radiated by the transmitting antenna 11 will follow the same type of pattern as indicated on line e of FIG. 6.

Returning to FIGS. 4 and 6, the input pulse 30 enters the second time delay 29 which is one second in this instance. The thus delayed pulse triggers an attenuator ramp control 45 (similar to the frequency ramp control 27) which produces at its output point f an attenuator ramp control signal 46. The leading edge of this signal 46 starts operation of an attenuator ramp generator 47 to produce a ramp voltage as shown at point g. This ramp voltage signal goes to an attenuator driver 49 and from there is fed on second control lead 22 to the attenuator 17 where the TWT output amplitude is reduced in proportion to the rise time and shape of the ramp voltage generated at point g. As is the case with the frequency control, the attenuator ramp voltage at g reaches a constant maximum before the end of the attenuator control signal 46.

Both the frequency control signal 34 and the attenuator control signal 46 have a trailing edge timed at the same instant, thus resetting or starting to reset their respective ramp generators 35 and 47 together. However, the system can obviously be modified to change the relative start or stop times of the two ramp control signals.

Figure 6:
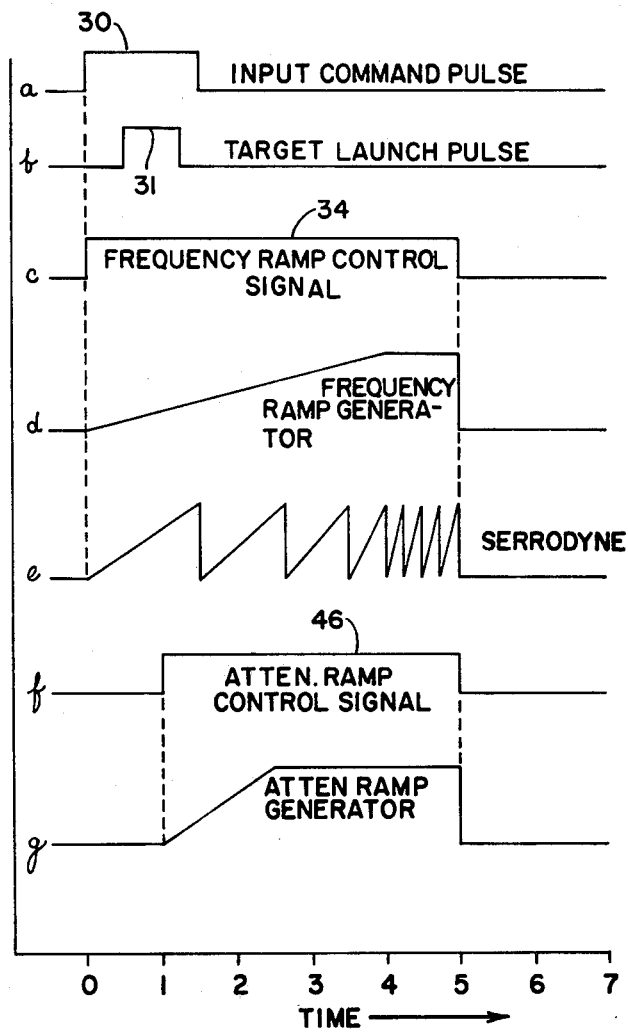
FIG. 6 is a timing diagram showing the programmed waveforms of the various signals developed in this invention.
Figure 7:
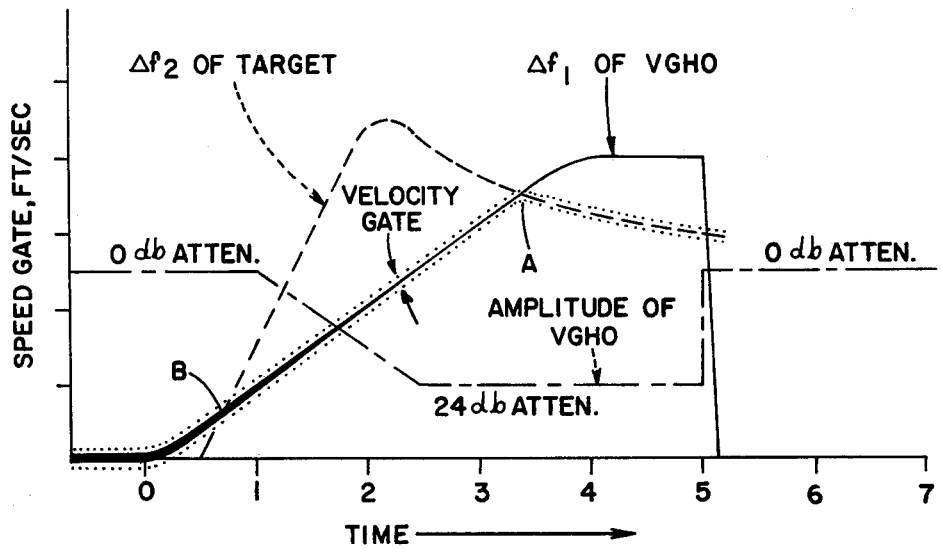
FIG. 7 is a composite graph showing the relation of the present VGHO signal to the independent target return signal with respect to time.

Overall operation of my invention can be seen by referring to FIG. 7 in connection with FIG. 6. The solid-line curve is the increase of reflected signal frequency, or $\Delta f_1$, produced by the VGHO system, starting to increase at time zero when the input command pulse 30 is received. The dash-line curve is the increase of reflected signal frequency, or $\Delta f_2$, produced by the target alone, starting at one-half second later when the target launch pulse 31 occurs. The acceleration of the target ahead of the carrier makes its reflected signal frequency rise faster than the programmed VGHO frequency. The dash-dot curve represents the programmed amplitude attenuation of the VGHO signal, starting at one second. The dotted lines represent the velocity gate operating range and action in the missile radar tracking system during the operating example of FIG. 7. Note that at point A on the graph, the velocity gate starts tracking the target 2 rather than the carrier 1 having the VGHO system. This is because at that common doppler frequency crossing, the VGHO return signal has dropped in intensity much below that of the target alone, and the velocity gate has been "handed off" to the target 2. This is the successful working of the present invention. There is also a common doppler frequency crossing at point B on the FIG. 7 graph, but the velocity gate probably will not change its tracked object here since the higher intensity VGHO signal at this time will prevent it.

No parameter figures are shown in FIG. 7, since this is just a pictorial aid to explain the system operation, but a true graph of this sort could serve in formulating the parameters of a system to be designed. In one actual system, the radar system frequency was 10 GHz, the VGHO doppler frequency increase was 20 KHz, and the corresponding radar system speed gate increase was about 1,000 feet per second (304.8 meters per second) in being handed off from the carrier drone to the target after the latter was launched from the carrier. The VGHO return signal attenuation was programmed to be 24 db.

The present system could be modified to perform the "hand off" at a point similar to point B of FIG. 7 without departing from the invention. This could be done if desired by starting the increase of the VGHO return signal frequency slightly sooner and also starting the decrease of amplitude sooner. The rate of doppler frequency increase and the acceleration of the target at launch time should not be too great for the missile radar system to follow.

Figure 8:
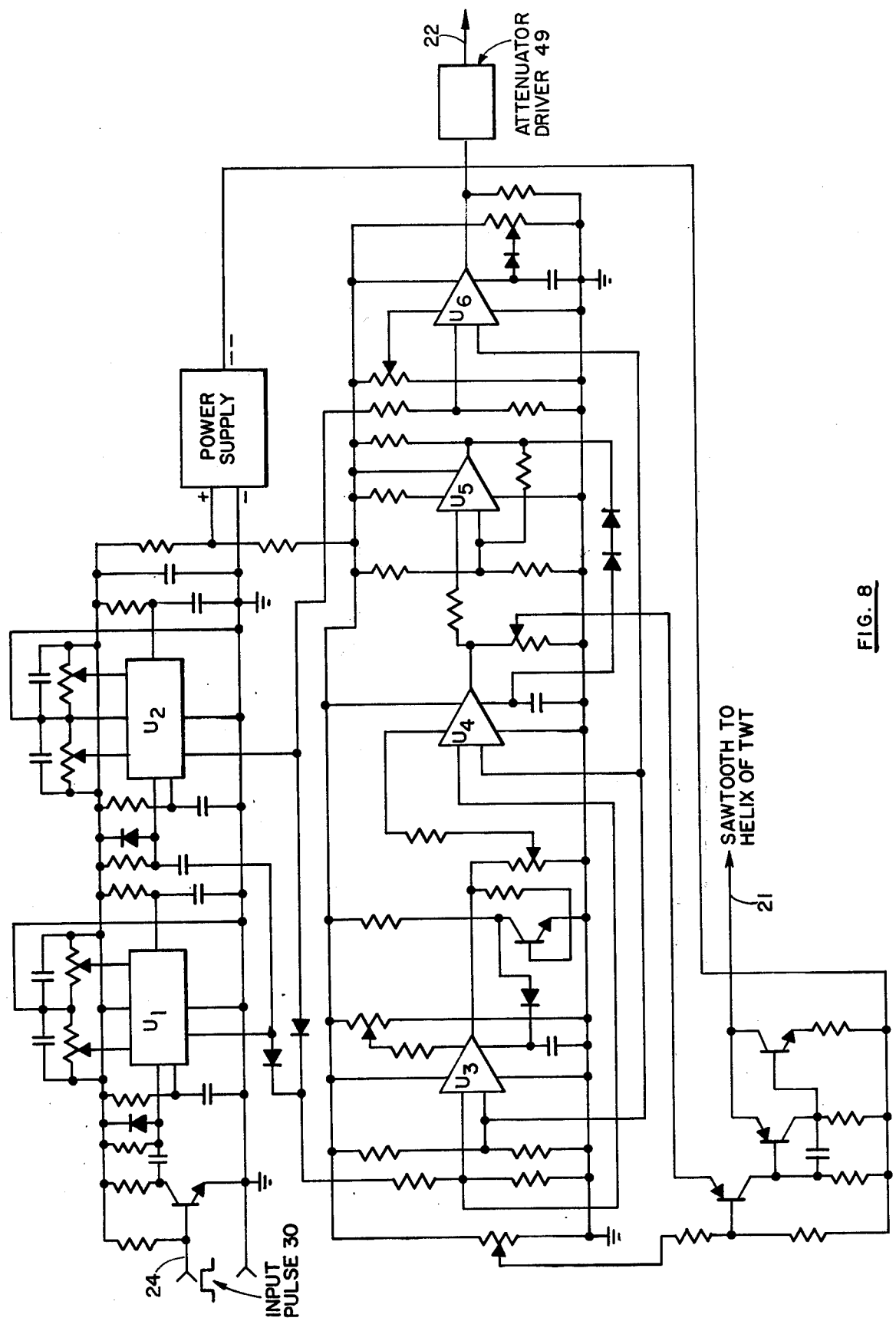
FIG. 8 is an electrical schematic diagram showing one implementation of the modulator portion of FIG. 4.

FIG. 8 shows one example of detailed circuitry for performing the functions of the portion of FIG. 4 labelled "modulator", i.e., to produce the waveforms equivalent to those shown in FIG. 6. Obviously, other equivalent circuitry may be substituted by persons skilled in the art, and a detailed description is not necessary. The serrodyne modulation of a traveling wave tube amplifier signal has already been referred to as a conventional technique. In FIG. 8, items $U_1$ and $U_2$ are dual timers available for whatever pulse sequencing and delay control is desired, and items $U_3$ through $U_6$ are operational amplifiers.

Thus it is seen that a relatively simple and quite reliable system is provided for transferring a radar guided missile's aiming path from one object to another in the near vicinity. This can be done while the missile is in flight. The invention solves the problem of having a missile destroy a target carrier instead of the intended expendable practice target. Other applications or uses of such a system may also suggest themselves from a knowledge of this invention.

While in order to comply with the statute, the invention has been described in language more or less specific as to structural features, it is to be understood that the invention is not limited to the specific features shown, but that the means and construction herein disclosed comprise the preferred mode of putting the invention into effect, and the invention is therefore claimed in any of its forms or modifications within the legitimate and valid scope of the appended claims.

I claim:

1. In a vehicle carrying a target to be launched therefrom for firing upon by a doppler radar guided missile; means for modifying the radar return signal from the carrier vehicle comprising:
   a. receiving antenna means in said carrier for receiving the radar signals of the missile radar system;
   b. signal amplifying means for amplifying said received radar signals;
   c. transmitting antenna means in said carrier for transmitting radar return signals;
   d. means for feeding said radar signals from said amplifying means to said transmitting antenna means;
   e. means for launching said target from said carrier vehicle; and
   f. modulator-timer means responsive to an input command to launch said target, said modulator-timer means comprising first ramp function means for increasing the frequency of said radar return for a first predetermined time period and second ramp function means for attenuating the amplitude of said radar return signal for a second predetermined time period, said time periods overlapping so that said frequency is high when said amplitude is low.

2. Apparatus in accordance with claim 1 wherein
   a. said signal feeding means includes a controllable attenuator;
   b. said frequency increasing means comprises phase modulating means connected to said amplifying means to effectively increase said frequency during the time interval desired; and
   c. said attenuating means comprises means generating a ramp control voltage connected to said attenuator.

3. Apparatus in accordance with claim 1 wherein
   a. said signal amplifying means comprises a traveling wave tube amplifier;
   b. said signal feeding means includes a controllable attenuator;
   c. said frequency increasing means comprises a serrodyne modulator connected to the helix of said traveling wave tube amplifier; and
   d. said attenuating means comprises electrical control means connected to said attenuator.

4. Apparatus in accordance with claim 1 including first time delay means for delaying the launch of said target for a short time after starting said frequency increase, and second time delay means for delaying the attenuation of said return signal for a short time after launch of said target.

5. Apparatus in accordance with claim 1 wherein the radar return signal amplitude from said carrier vehicle is normally greater than that of said target alone, and wherein the amplitude of said carrier return signal, when attenuated, is substantially less than that of said target alone.

6. Apparatus in accordance with claim 1 wherein said target launching means includes means for starting a thrust motor in said target for accelerating said target away from said carrier, said thrust motor having a finite operating time, and wherein said frequency increasing means is programmed to increase said carrier return signal frequency at a lesser rate than the target return signal frequency after launch thereof to increase the doppler frequency of said target return signal above that of said carrier return signal for a period of time, said frequency increasing means also being programmed to continue beyond the target thrust motor operating time so that the target return signal doppler frequency drops lower than the apparent increased carrier return signal doppler frequency again as the velocity of said target decreases, whereby there is thus provided a point in time where a velocity gate in said missile radar is caused to stop tracking said carrier and start tracking said target.

7. Apparatus in accordance with claim 1 wherein said carrier vehicle is a remote controlled drone aircraft, said means for launching said target including means for receiving a remote transmitted input command signal into the input of said modulator-timer.

8. The method of changing the aiming point of a doppler radar guided missile from a first moving object to a second moving object just after said second object has been separated and accelerated away from said first object, comprising increasing the frequency and decreasing the amplitude of the radar return signal from said first object to the missile radar at predetermined rates so that the doppler frequency from said first object appears to rise to that of said second object while the decreased amplitude of said return signal from said first object falls substantially below that of said second object.

9. Method in accordance with claim 8 wherein said frequency and amplitude are held constant for a period of time at their maximum changed values.

10. In a system of providing an airborne target for a doppler radar guided missile wherein a target carrier vehicle carries the target toward the missile firing vicinity and launches the target after being fired upon, the method of handing off the velocity gate of the missile radar from the carrier to the target alone just after launching said target, which comprises:

a. producing an input command signal at said carrier;

b. initiating a ramp type frequency increase of the radar signal returned from said carrier to said missile radar substantially upon receipt of said input signal;

c. launching said target in accelerating flight away from said carrier at a first predetermined time delay after receipt of said input signal, the normal accelerating time of said target before free flight being known and the acceleration of said target being sufficient to cause a significantly greater doppler frequency increase than that caused by said return signal frequency increase from said carrier;

d. initiating a ramp type amplitude decrease of said radar signal returned from said carrier to said missile radar at a second, later, predetermined time delay after receipt of said input signal; and e. maintaining said return frequency high and said return amplitude low until sufficiently after said target normal accelerating time so that the doppler frequency from said target alone drops lower than that appearing from said carrier, whereby the velocity gate of said missile radar is handed off to said target and said missile starts tracking said target instead of said carrier.

* * * * *